(No Model.) 2 Sheets—Sheet 1.
L. A. ASPINWALL.
CORN PLANTER.
No. 397,771. Patented Feb. 12, 1889.
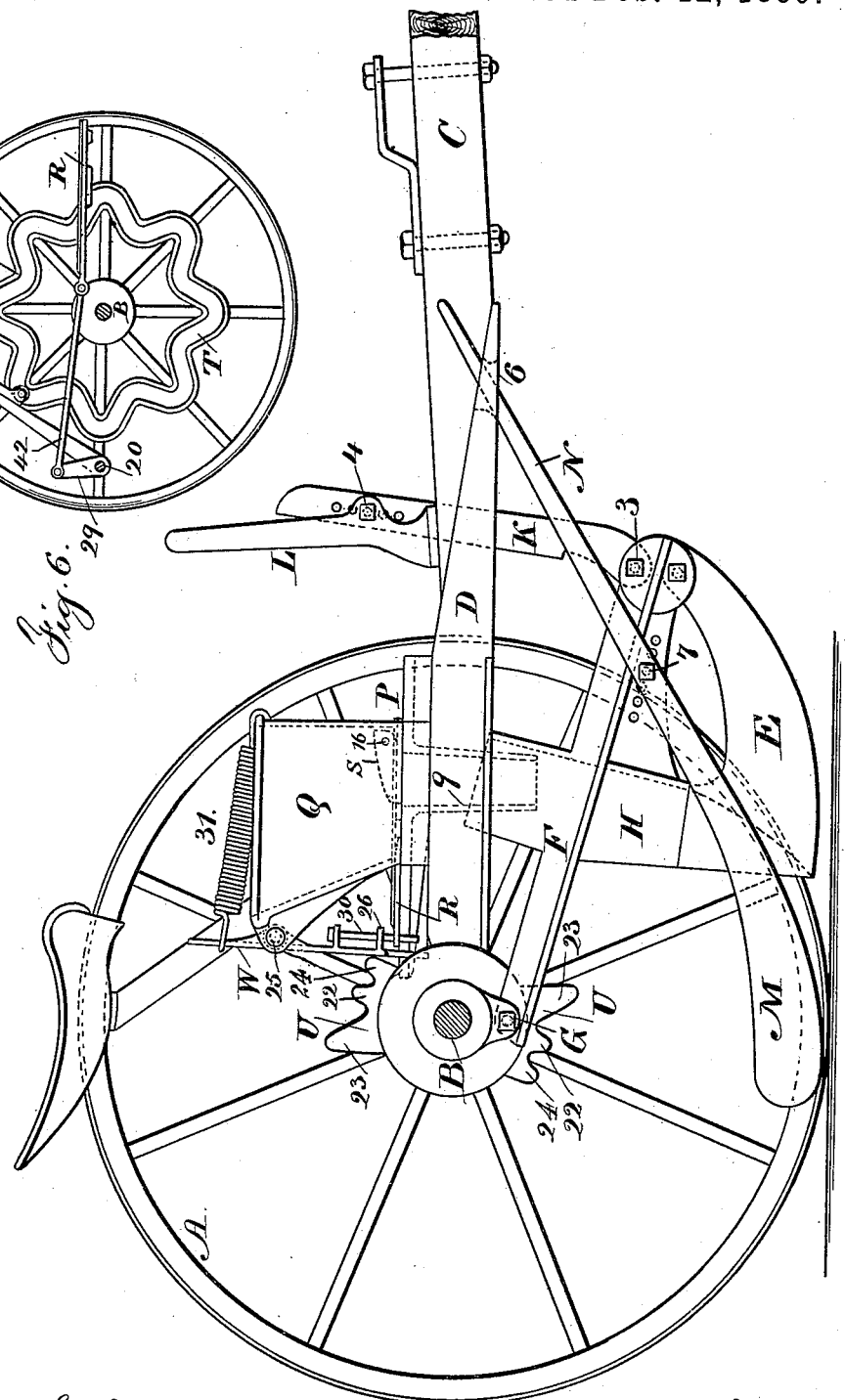

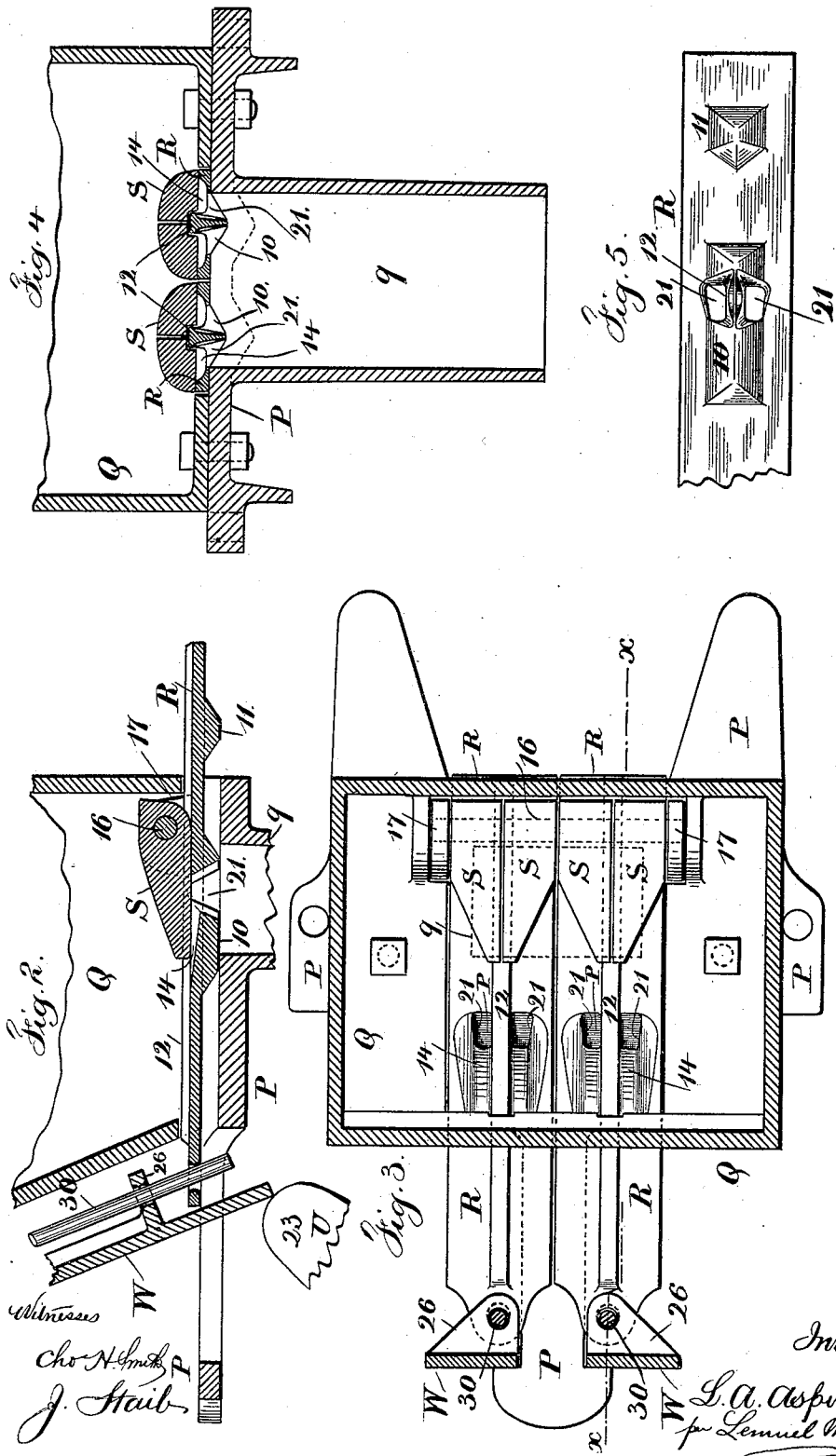

UNITED STATES PATENT OFFICE.

LEWIS AUGS. ASPINWALL, OF THREE RIVERS, MICHIGAN, ASSIGNOR TO THE ASPINWALL MANUFACTURING COMPANY, OF SAME PLACE.

CORN-PLANTER.

SPECIFICATION forming part of Letters Patent No. 397,771, dated February 12, 1889.

Application filed February 20, 1888. Serial No. 264,609. (No model.)

*To all whom it may concern:*

Be it known that I, LEWIS AUGUSTUS ASPINWALL, of Three Rivers, in the county of St. Joseph and State of Michigan, have invented an Improvement in Corn-Planters, of which the following is a specification.

This invention relates especially to the corn-dropping apparatus in which there is a tubularly-constructed slide in the bottom of the hopper for receiving the corn and conveying the same to the point of delivery.

In the drawings, Figure 1 is an elevation of the corn-planter, one wheel being removed and the axle in section. Fig. 2 is a section of the lower part of the hopper longitudinally of the slide at the line $x$ $x$ of Fig. 3. Fig. 3 is a sectional plan near the bottom of the hopper. Fig. 4 is a cross-section of the slides at the bottom of the hopper. Fig. 5 is an inverted plan of a portion of one of the slides, and Fig. 6 represents a cam and lever that may be employed for moving the slide.

The wheels A, axle B, and tongue or pole C are of ordinary character, and the frame D extends from the axle B to the tongue C and supports the corn-dropping mechanism. The plow E is adapted to open the furrow, and it is fastened at the front end to the bar F, that is pivoted or hinged upon the axle B by the bolt or hinge G, and the tubular spout or chute H, down which the grain passes into the furrow, is of any ordinary character. The link K is hinged at 3 to the front end of the plow, and there is a lever, L, connected to the link K by the bolt 4, and this lever L rests upon the tongue C and supports the plow out of contact with the ground when going to or returning from the field, and there are several holes in the link K for the bolt 4, so that the plow may be raised more or less. The coverer M is of ordinary shape, except that it is formed with a forward extension or lever, N, which is free to slide through the loop at 6 on the front part of the frame D, and there is a bolt, 7, passing into one of the row of holes in the bar F above the plow E. When in use, the coverer M slides along upon the ground, only penetrating about a uniform distance, and by changing the bolt 7 the plow E can be either raised or lowered in its relation to the coverer M, and thereby said plow will cut a deeper or shallower furrow, as may be desired, for planting the corn. This coverer M is raised off the ground when the plow E is elevated.

Upon the frame D is a plate, P, having a chute, 9, that is above the chute H, and this plate P forms the bottom of the hopper Q, and the parts are bolted together, as seen in Fig. 4. The hopper is adapted to receive one or more slides, R. I have shown two of such slides.

Each slide R is formed as a plate resting at its edges upon the flat portion of the plate P, and this plate P is grooved with shallow V-shaped grooves, and upon the under side of the slide R there are downward projections 10 and 11, similar in shape to the grooves, so as to fit therein. The downward projection 10 is sufficiently long to receive through it an opening or hole, 21. Sometimes I only use one such hole; but usually there are two of them at opposite sides of and adjacent to the central rib, 12, upon the top of the slide R. Each hole 21 is beveled downwardly, so as to be considerably larger upon the under side than upon the top surface, and the rim 12 between these holes is made much the thinnest at the bottom, as seen in Fig. 4, and the top surface of the slide R is removed or beveled at 14 to form an incline. Each hole is adapted to receive one grain of corn, and as the slide R is reciprocated beneath the mass of corn lying in the hopper Q one grain passing down the incline 14 drops into the hole 21, and it lies upon the top of the plate P in the V-shaped groove thereof, so that when the slide R is moved along, so that the hole 21 comes over the chute 9, the grain of corn drops away freely, because the hole is larger at the under side, and there is nothing to support the grain of corn or to cause it to wedge within such hole 21. Where there are two holes in each slide, they are at opposite sides of the rib 12. Where but one hole is used, it is at one side only of this rib 12.

Within the hopper Q there are the cut-offs S, which are pivoted at 16 upon a pin supported at its ends by flanges 17 upon the plate P. These cut-offs are grooved upon their under surfaces for the passage of the rib 12, and their outer ends or points serve to keep back the corn and prevent more than one grain being conveyed to the chute 9.

The lower edges of the hopper Q are mortised or cut away, so that the slides R can be freely introduced and slipped into place or removed therefrom when necessary, and motion is given to these slides R to reciprocate or shake them endwise in conveying the grain of corn successively to the point of delivery. With this object in view any suitable mechanism may be made use of—such, for instance, as a zigzag or star-shaped cam, T, upon one of the wheels A, acting upon a lever, T', having a rock-shaft, 20, and a crank, 29, and link 42, connected to the slide R; but I prefer to make use of the agitating-cams U upon the shaft B, such cams U having two or more fingers or projections, 24 22 23, which act successively to move or shake the slide R endwise beneath the mass of corn in the hopper Q and insure the passage into the hole 21 of one grain of corn, and then the longest finger, 23, of the cam U moves the slide R sufficiently far to bring the opening 21 over the chute 9, as seen in Fig. 2. I prefer to also make use of the hanging rocker-arms W, that are pivoted at 25 upon the hopper and provided with ears 26, through which passes the drop-pin 30 and enters the hole near the end of the slide R. By this means the rocker-arm and slide are easily connected, and by raising the pin 30 the slide is disconnected, so that it can be pulled out from below the hopper or can be thrown out of action. The spring 31 serves to keep the lower end of the rocker-arm W toward the cam U.

I claim as my invention—

1. The combination, with the hopper in a corn-planter, of the slide R, having an incline, 14, and a downward projection, 10, with an opening, 21, in said projection that is largest on the under side, and the plate P, upon which the slide R rests, said plate having a V-shaped groove in its upper surface for the reception of the projection on the under side of the slide R, substantially as set forth.

2. The combination, with the hopper in a corn-planter, of the slide R, having a rib, 12, on its upper surface and a downward projection, 10, on the under surface, and the hole 21, passing through the slide and largest at the under side, the plate P, grooved to receive the projection on the under side of the slide R, and the cut-off S within the hopper and above the slide, substantially as set forth.

3. The combination, with the hopper Q, plate P, and chute 9, of the slide R above the plate P and passing across the bottom of the hopper, the rocker-arm W, pivoted at 25 upon the hopper, the drop-pin 30, passing into the hole in the slide R, and the cam U, for giving motion to the rocker-arm and slide, substantially as set forth.

4. The combination, with the wheels A, axle B, frame D, hopper Q, and slide R, of the cam U, secured to said axle and having fingers 22 23 24 formed therein of varying length and radial to said axle, the fingers 22 and 24 to give the slide R a rapid vibration, and the finger 23 to move the slide to the point of delivery of the grain, substantially as set forth.

5. The combination, in a corn-planter, of mechanism for dropping the corn, the plow E, for opening the furrow, the bar F, hinged to the axle of the corn-planter, a coverer, M, pivoted at about its middle to the frame F, and having a lever end passing through an opening or support in the frame of the corn-planter, a support upon said frame for the lever end of said coverer, and a movable pin for connecting the coverer with the bar F of the plow for varying the depth of the furrow, substantially as set forth.

6. The combination, with the wheels, axle, tongue, and frame in a corn-planter, of the hopper for the corn, a slide for dropping the same, a plow for opening the furrow, a bar, F, to which the plow is fastened, which bar is hinged at its rear end to the axle, a link, K, lever L, for raising or lowering the plow, a coverer, M, pivoted at about its middle to the bar F and having a forward extension or lever, N, a support for the lever portion N upon the frame, and a movable bolt for connecting the coverer to the bar F, substantially as and for the purposes set forth.

Signed by me this 14th day of February, 1888.

L. AUGS. ASPINWALL.

Witnesses:
D. W. THAYER,
WALTER ALEXANDER.